(12) United States Patent
Hagiwara

(10) Patent No.: US 7,014,484 B2
(45) Date of Patent: Mar. 21, 2006

(54) ELECTRONIC APPARATUS, AND FUNCTION EXPANDING UNIT THAT EXPANDS FUNCTIONS OF THE ELECTRONIC APPARATUS

(75) Inventor: Kunihiko Hagiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/925,927

(22) Filed: Aug. 26, 2004

(65) Prior Publication Data

US 2005/0020139 A1    Jan. 27, 2005

Related U.S. Application Data

(63) Continuation of application No. PCT/JP02/01763, filed on Feb. 26, 2002.

(51) Int. Cl.
*H01R 13/62* (2006.01)

(52) U.S. Cl. .................... 439/159; 439/638; 439/945

(58) Field of Classification Search ............... 439/638, 439/945, 946, 159, 152; 361/684–686; 365/51
See application file for complete search history.

(56) References Cited

U.S. PATENT DOCUMENTS

| | | | | |
|---|---|---|---|---|
| 5,689,654 | A | * | 11/1997 | Kikinis et al. ............. 710/303 |
| 5,712,763 | A | * | 1/1998 | Bullister ..................... 361/686 |
| 5,801,922 | A | * | 9/1998 | Shen et al. ................. 361/686 |
| 6,069,795 | A | * | 5/2000 | Klatt et al. ................. 361/737 |
| 6,097,605 | A | * | 8/2000 | Klatt et al. ................. 361/737 |
| 6,457,647 | B1 | * | 10/2002 | Kurihashi et al. .......... 235/486 |
| 6,525,932 | B1 | * | 2/2003 | Ohnishi et al. ............ 361/686 |
| 6,691,196 | B1 | * | 2/2004 | Mills et al. ................. 710/301 |

FOREIGN PATENT DOCUMENTS

| | | |
|---|---|---|
| JP | 07-160364 | 6/1995 |
| JP | 07-175554 | 7/1995 |
| JP | 10-334205 | 12/1998 |
| JP | 2001-188883 | 7/2001 |

OTHER PUBLICATIONS

Computer-Generated English Translation of JP 07-175554.

* cited by examiner

*Primary Examiner*—Gary F. Paumen
(74) *Attorney, Agent, or Firm*—Staas & Halsey LLP

(57) ABSTRACT

An electronic apparatus having functions to be expanded by first and second function expanding media includes a connector that is connectable electrically to an adapter, the adapter having a first insertion opening into which the first function expanding medium is detachably inserted, and a second insertion opening into which the second function expanding medium is detachably inserted, and a housing that has first and second surfaces, and accommodates the adapter, the first surface having a third insertion opening that exposes the first insertion opening, and the second surface being arranged substantially orthogonal to the first surface and having a fourth insertion opening that exposes the second insertion opening.

18 Claims, 15 Drawing Sheets

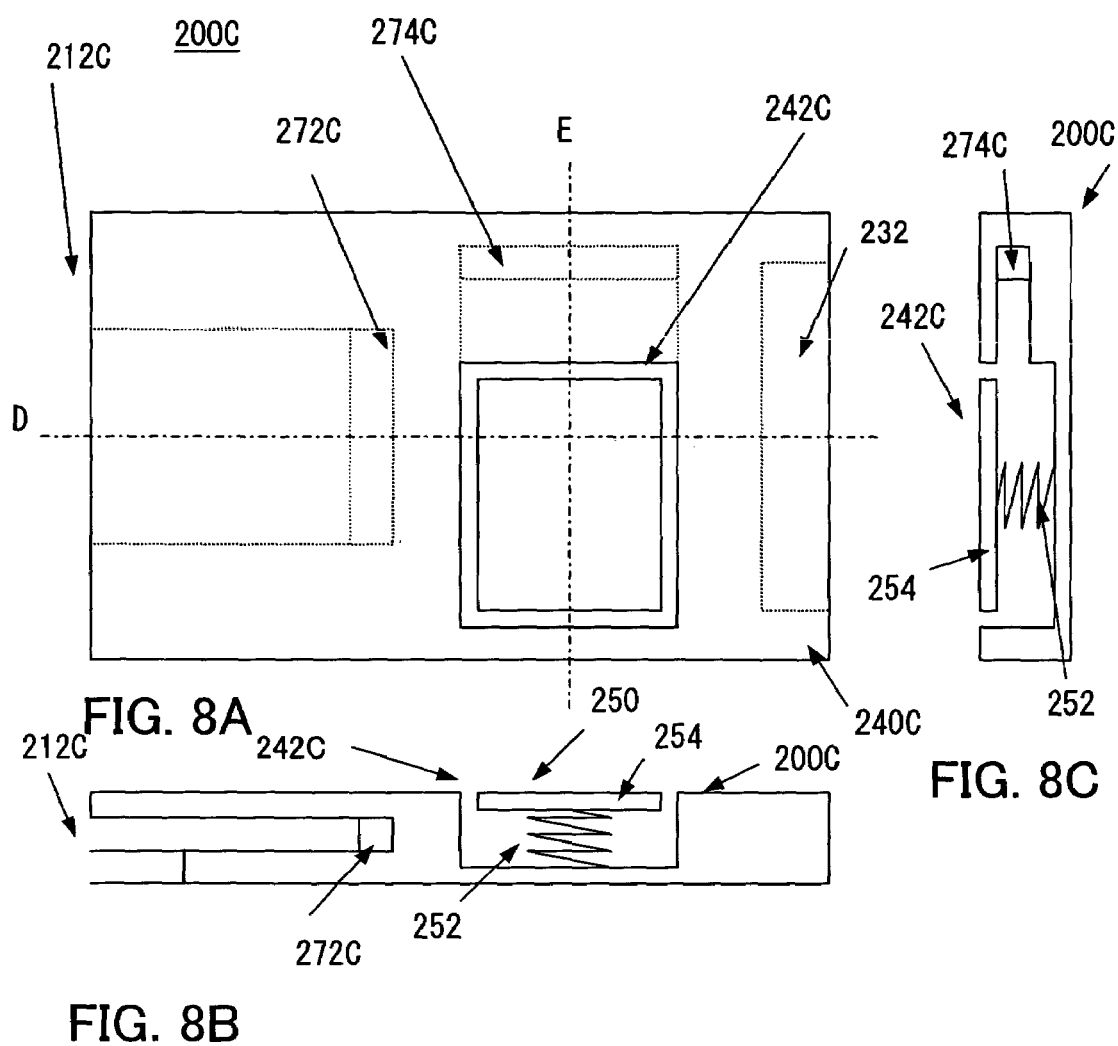

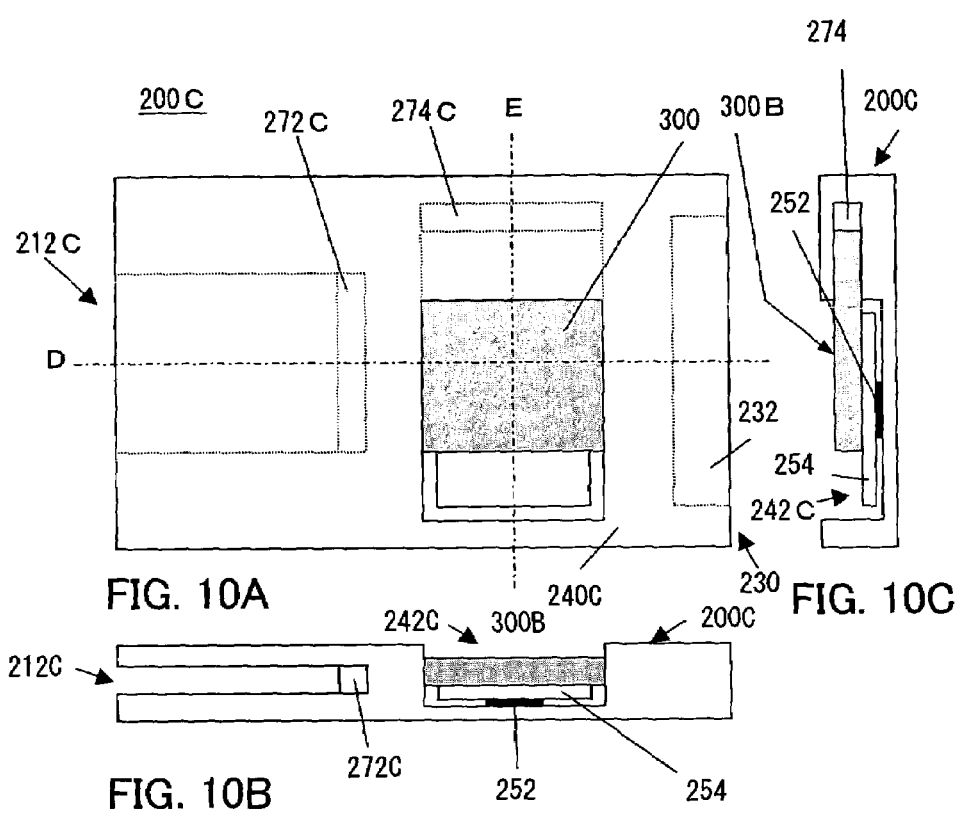

PRIOR ART

ELECTRONIC APPARATUS, AND FUNCTION EXPANDING UNIT THAT EXPANDS FUNCTIONS OF THE ELECTRONIC APPARATUS

This application is a continuation based on PCT International Application No. PCT/JP02/01763, filed on Feb. 26, 2002, which is hereby incorporated by reference herein in its entirety as if fully set forth herein.

BACKGROUND OF THE INVENTION

The present relates generally to electronic apparatuses, such as a personal computer ("PC"), a cell phone, a personal handy-phone system ("PHS"), a game machine, a personal digital assistant ("PDA"), a digital camera, a digital video, and a music player, and a function expanding unit that is wire-connected or wireless-connected to the electronic apparatus and expands functions of the electronic apparatus. The function expanding unit broadly covers external storages, such as a hard disc drive ("HDD"), output devices, such as a printer, input devices, such as a mouse and a scanner, and communication apparatuses, such as a modem and a network-connecting unit.

Media cards, such as a SD card, a Memory Stick, and a Smart Media, have recently been widespread and used as storage media for electronic apparatuses, such as digital cameras and PCs. One means for reading data from the media card on a PC and for writing data from the PC onto the media card is to insert the media card into a media card adapter and insert the adapter into a PC card slot in the PC so as to read and write the data.

Usually, the media cards have different shapes and sizes according to types, and different adapters are generally used for different media cards: For example, a SD card is associated with a SD card adapter, and a Memory Stick is associated with a Memory Stick adapter. However, this system is costly and arduous because a user has to exchange an adapter whenever he exchanges a media card.

Accordingly, Japanese Patent Application, Publication No. 2001-188883 proposes an adapter that can detachably accommodate plural media cards of the same type or different types. With this adapter, the electronic apparatus does not have to include plural media card connectors only if the electronic apparatus has a connector with this adapter, thereby advantageously expanding functions of an electronic apparatus and facilitating manufacturing of the electronic apparatus.

Japanese Patent Application, Publication No. 2001-188883 discloses, as shown in FIG. 17, an adapter 3 that has three slots 6a, into which a SD card 15 is releasably inserted, on a side surface 4a along a longitudinal direction, and one slot 6b, into which a SD card 16 of a different type from the SD card 15 is releasably inserted, on a side surface 4b along a lateral (or width) direction.

However, the conventional electronic apparatus does not enable plural media cards to be independently inserted into and ejected from the adapter while the adapter is being accommodated in the housing of the electronic apparatus. The housing of the electronic apparatus has a slot, into which the adapter is releasably inserted. When the adapter slot exposes the media-card slot, the media card can be inserted into and ejected from the adapter while the adapter is being accommodated in the housing of the electronic apparatus. For example, the media card 16 is inserted into and ejected from the adapter 3 shown in FIG. 17, while the adapter 3 is being accommodated in the electronic apparatus (not shown). However, when the adapter 3 shown in FIG. 17 is inserted into the housing of the electronic apparatus (not shown), the slots 6a are shielded by the housing of the electronic apparatus (not shown) and no media card 15 is inserted into and ejected from the adapter 3 in this state. In order to insert the media card 15 into the adapter 3 and eject the media card 15 from the adapter 3, the adapter 3 needs to be arduously ejected from the electronic apparatus. Thus, the conventional electronic apparatus has a disadvantage of bad operability.

BRIEF SUMMARY OF THE INVENTION

Accordingly, it is a general object of the present invention to provide a novel and useful electronic apparatus and function expanding unit, in which the above prior art disadvantages are eliminated.

Another and more specific object of the present invention is to provide an electronic apparatus and function expanding unit that have improved operability.

An electronic apparatus according to one aspect of the present invention having functions to be expanded by first and second function expanding media includes a connector that is connectable electrically to an adapter, the adapter having a first insertion opening into which the first function expanding medium is detachably inserted, and a second insertion opening into which the second function expanding medium is detachably inserted, and a housing that has first and second surfaces, and accommodates the adapter, the first surface having a third insertion opening that exposes the first insertion opening, and the second surface being arranged substantially orthogonal to the first surface and having a fourth insertion opening that exposes the second insertion opening. This electronic apparatus enables the first and second function expanding media to be independently inserted into and ejected from the adapter while the adapter is accommodated in the housing because the third and fourth insertion openings expose the first and second insertion openings.

An electronic apparatus according to one aspect of the present invention having functions to be expanded by first and second function expanding media includes a connector that is connectable electrically to an adapter, the adapter having a first insertion opening into which the first function expanding medium is detachably inserted, and a second insertion opening into which the second function expanding medium is detachably inserted; and a housing that has first and second surfaces, and accommodates the adapter, the first surface having a third insertion opening that exposes the first insertion opening, and a fourth insertion opening that exposes the second insertion opening, and the second surface being arranged substantially orthogonal to the first surface and having a fifth insertion opening into which the adapter is detachably inserted. This electronic apparatus also enables the first and second function expanding media to be independently inserted into and ejected from the adapter while the adapter is accommodated in the housing because the third and fourth insertion openings expose the first and second insertion openings.

An electronic apparatus according to still another aspect of the present invention having functions to be expanded by first and second function expanding media includes a connector that is connectable electrically to an adapter, the adapter having a first insertion opening into which the first function expanding medium is detachably inserted, and a second insertion opening into which the second function expanding medium is detachably inserted, and a housing that accommodates the adapter, and has a third insertion opening that exposes the first insertion opening, and a fourth insertion opening that exposes the second insertion opening, and a fifth insertion opening into which the adapter is detachably inserted, wherein at least one of the first and second function expanding media are inserted into at least one of the third and fourth insertion openings in a direction substantially orthogonal to a direction in which the adapter is inserted into the fifth insertion opening. This electronic apparatus also enables the first and second function expanding media to be independently inserted into and ejected from the adapter while the adapter is accommodated in the housing because the third and fourth insertion openings expose the first and second insertion openings.

The fifth insertion opening may be a PC card slot. The adapter may include an eject button to eject the second function expanding medium, and the fourth insertion opening further exposes the eject button.

An electronic apparatus according to still another aspect of the present invention having functions to be expanded by an function expanding medium includes a connector that is connectable electrically to an arbitrary adapter selected from plural types of adapters, each adapter having at least two insertion openings into which at least two function expanding media are detachably inserted, and a housing that accommodates the adapter, and has a slot into which the adapter is detachably inserted, and at least two mouths that expose the at least two insertion openings, wherein at least one of the function expanding media are inserted into at least one of the insertion openings via the mouth in a direction substantially orthogonal to a direction in which the adapter is inserted into the slot. This electronic apparatus enables the function expanding media to be independently inserted into and ejected from the adapter while the adapter is being accommodated in the housing, because the mouth exposes the insertion opening. In addition, the electronic apparatus is compatible with plural types of adapters, and thus has good function expandability.

A function expanding unit according to still another aspect of the present invention that is connectible electrically to an electronic apparatus and expands functions of the electronic apparatus includes a connector that is connectable electrically to an adapter, the adapter having a first insertion opening into which a first function expanding medium that expands functions of the electronic apparatus is detachably inserted, and a second insertion opening into which a second function expanding medium that expands functions of the electronic apparatus is detachably inserted, and a housing that has first and second surfaces, and accommodates the adapter, the first surface having a third insertion opening that exposes the first insertion opening, and the second surface being arranged substantially orthogonal to the first surface and having a fourth insertion opening that exposes the second insertion opening. This function expanding unit enables the first and second function expanding media to be independently inserted into and ejected from the adapter while the adapter is accommodated in the housing because the third and fourth insertion openings expose the first and second insertion openings.

A function expanding unit according to still another aspect of the present invention that is connectible electrically to an electronic apparatus and expands functions of the electronic apparatus includes a connector that is connectable electrically to an adapter, the adapter having a first insertion opening into which a first function expanding medium that expands functions of the electronic apparatus is detachably inserted, and a second insertion opening into which a second function expanding medium that expands functions of the electronic apparatus is detachably inserted, and a housing that has first and second surfaces, and accommodates the adapter, the first surface having a third insertion opening that exposes the first insertion opening, and a fourth insertion opening that exposes the second insertion opening, and the second surface being arranged substantially orthogonal to the first surface and having a fifth insertion opening into which the adapter is detachably inserted. This function expanding unit also enables the first and second function expanding media to be independently inserted into and ejected from the adapter while the adapter is accommodated in the housing because the third and fourth insertion openings expose the first and second insertion openings.

A function expanding unit according to still another aspect of the present invention that is connectible electrically to an electronic apparatus and expands functions of the electronic apparatus includes a connector that is connectable electrically to an adapter, the adapter having a first insertion opening into which a first function expanding medium that expands functions of the electronic apparatus is detachably inserted, and a second insertion opening into which the second function expanding medium that expands functions of the electronic apparatus is detachably inserted, and a housing that accommodates the adapter, and has a third insertion opening that exposes the first insertion opening, and a fourth insertion opening that exposes the second insertion opening, and a fifth insertion opening into which the adapter is detachably inserted, wherein at least one of the first and second function expanding media are inserted into at least one of the third and fourth insertion openings in a direction substantially orthogonal to a direction in which the adapter is inserted into the fifth insertion opening. This function expanding unit also enables the first and second function expanding media to be independently inserted into and ejected from the adapter while the adapter is accommodated in the housing because the third and fourth insertion openings expose the first and second insertion openings.

The fifth insertion opening may be a PC card slot. The adapter may include an eject button to eject the second function expanding medium, and the fourth insertion opening further exposes the eject button.

Other objects and further features of the present invention will become readily apparent from the following description of the embodiments with reference to accompanying drawings.

BRIEF DESCRIPTION OF THE DRAWINGS

FIGS. 8A–8C are schematic plane, longitudinal sectional, and lateral sectional views of the media card adapter shown in FIG. 7.

FIGS. 10A–10C are schematic plane, longitudinal sectional, and lateral sectional views of the media card adapter into which the media card has been inserted by the method shown in FIGS. 9A–9C.

DETAILED DESCRIPTION OF PREFERRED EMBODIMENT

Figure 1:
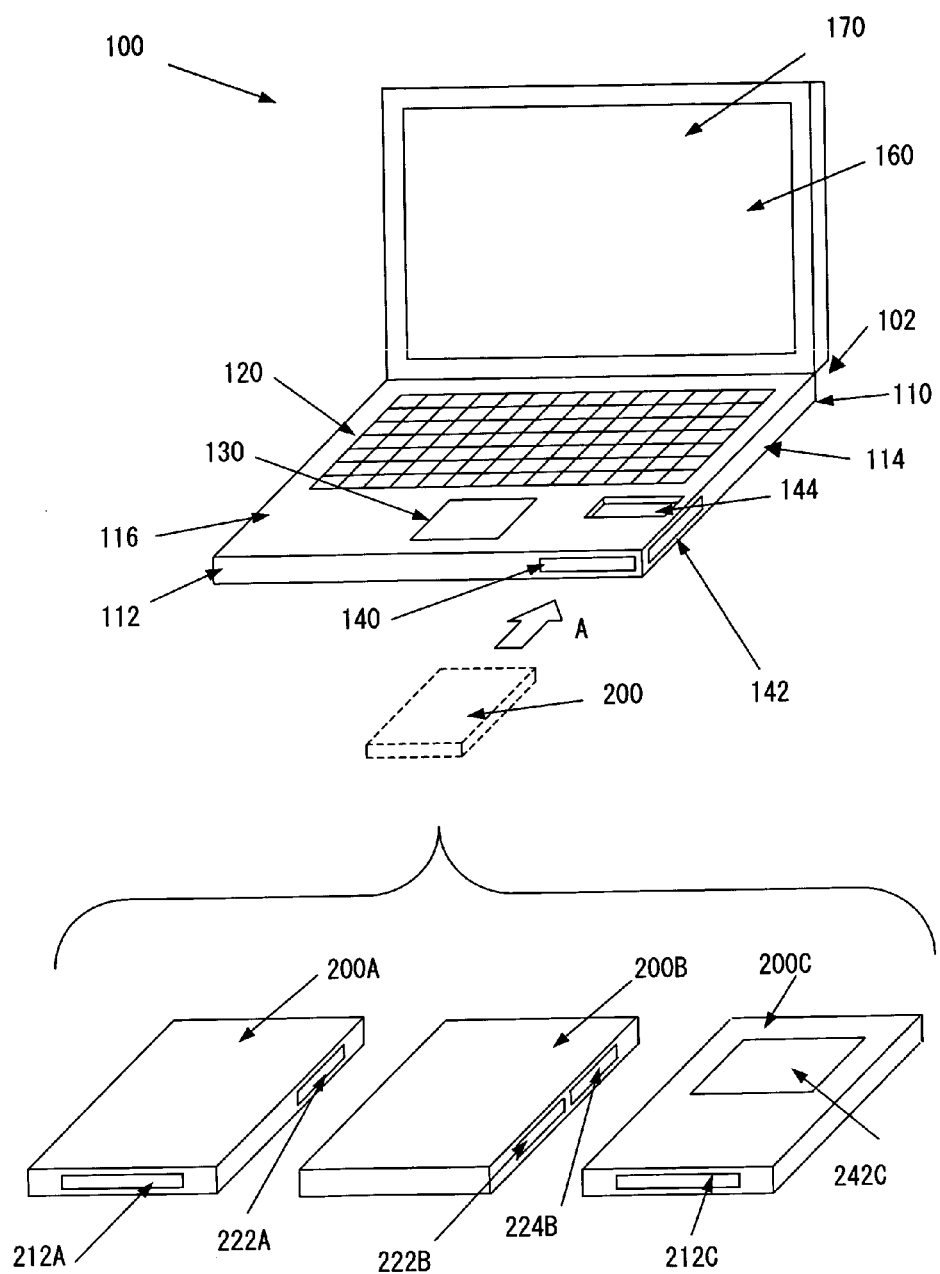
FIG. 1 is a schematic perspective view of an electronic apparatus of a first embodiment according to the present invention.

A description will now be given of an electronic apparatus 100 according to a first embodiment of the present invention, which is implemented as a laptop PC, with reference to the accompanying drawings. Here, FIG. 1 is a schematic perspective view of the laptop PC 100. Referring to FIG. 1, the electronic apparatus 100 is exemplarily embodied, but not limited to, as a laptop PC 100, and covers a PDA, hand-held PC, a palm-sized PC, a wearable computer, a portable electronic apparatus, a portable terminal, a game machine, a digital camera, a digital video, a music player, etc. The laptop PC 100 covers A4 size, B5 size, and other sub-note and mini-note size.

The laptop PC 100 includes a base (or a lower housing) 110 as a PC body, and a liquid crystal display ("LCD") bezel frame (or an upper housing) 160, which are connected by a hinge 102.

The base 110 has a thickness, for example, of about 20 to 30 mm. FIG. 1 shows a front surface 112, a left side surface 114, a top surface 116. The front surface 112, side surface 114 and top surface 116 are arranged orthogonal to each other.

The front surface 112 of the base 110 forms a PC card slot 140. The PC card slot 140 is an opening into which a PC card is inserted and from which the PC card is ejected. Here, "PC card" is pursuant to the card-shaped peripheral standard for personal computers established commonly by Personal Computer Memory Card International Association ("PCMCIA") and Japan Electronic Industry Development Association ("JEIDA"). The PC card has a size of 85.6 mm×54 mm, and is classified into three types including types 1 to 3 (having thicknesses of 3.3 mm, 5.0 mm, and 10.5 mm) or four types that adds a Thick type having a thickness of 18.0 mm to the above). A media card adapter 200, which will be described later, is inserted into and ejected from the laptop PC 100 via the PC, card slot 140. The PC card slot 140 exposes slots 212A and 212C, which will be described later, when the adapter 200A and 200C are inserted into the laptop PC 100.

A media-card insertion/ejection window 142 is formed on the side surface 114 of the base 110, and exposes slots 222A, 222B, 224B, which will be described later, when the adapter 200A and 200B are inserted into the laptop PC 100.

A media-card insertion/ejection window 144, a keyboard 120 used to type information, and a pointing device 130 are formed on the top surface 116 of the base. The media-card insertion/ejection window 144 exposes a slot 242C, which will be described later, when-the adapter 200C is inserted into the laptop PC 100.

Types of the keyboard 120 may include 101, 106, 109 and ergonomics, and key arrangements include QWERTY, DVORAK, JIS, new-JIS, and NICOLA (Nihongo Nyuryoku Conthotium Layout). The pointing device 130 emulates part of mouse functions, and may include a mouse, a trackball, a trackpad, a tablet, a digitizer, a joystick, a joypad, a touch panel, and a stylus pen irrespective of the structure shown in FIG. 1.

Figure 5:
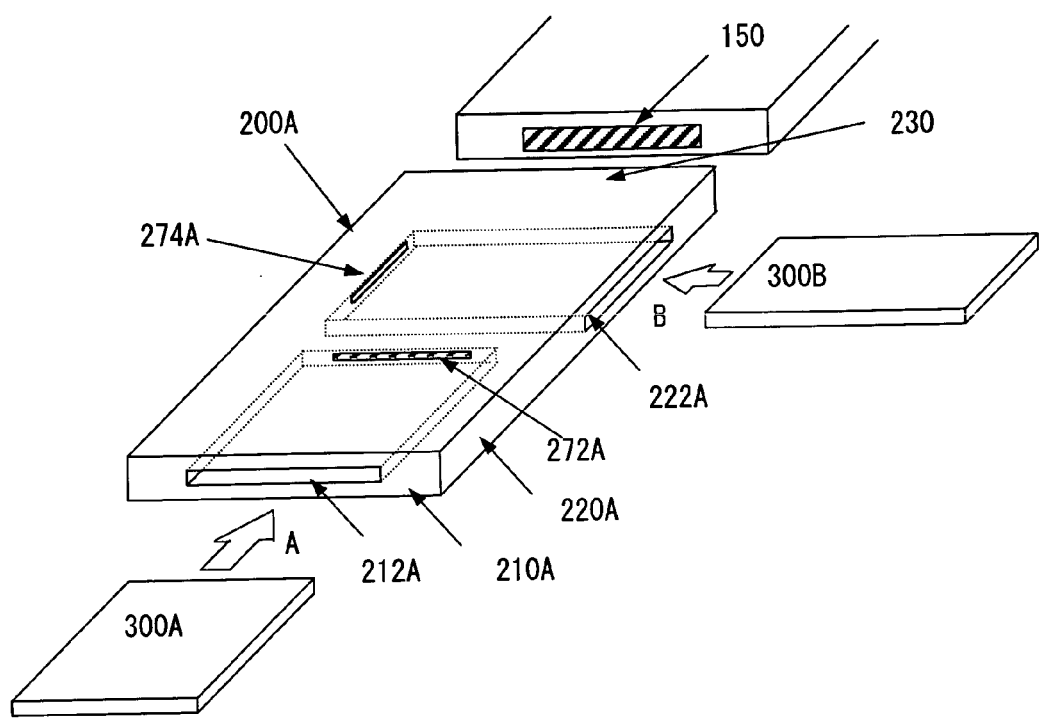
FIG. 5 is a schematic perspective view of a media card to be inserted into a media card adapter applicable to the electronic apparatus shown in FIG. 1.

The connector 150 shown in FIG. 5 that is connectible electrically to the adapter 200 is formed in the PC card slot 140 in the base 110. The connector 150 is embodied as a PC card connector.

The LCD screen is provided on the LCD bezel frame 160, and the LCD bezel frame 160 has a substantially rectangular shape to hold the LCD screen 170.

The media card adapter 200, which is inserted into the laptop PC 100 in an arrow A direction shown in FIG. 1, generalizes plural types of media card adapters 200A to 200C, and is one that is arbitrarily selected from them. Unless otherwise specified in FIG. 12, etc., an illustration of a media card adapter 200's eject button used to eject a media card 300 is omitted.

A description will now be given of the media card adapter 200A with reference to FIG. 5. Here, FIG. 5 is a schematic perspective view of the media card adapter 200A. The media card adapter 200A has a rectangular parallelepiped shape similar to the PC card, and has a front surface 210A that has a media card slot 212A, a side surface 220A that has a media card slot 222A, and a rear surface 230 that forms a PC-card connector 232 (not shown) that serves as a connector to be connected to a connector 150 of the laptop computer PC 100. The front surface 210A, side surface 220A and rear surface 230 are arranged orthogonal to each other.

The media card slot 212A serves as an insertion opening, into which the media card 300A, which will be described later, is detachably inserted. The media card slot 222A serves as an insertion opening, into which the media card 300B, which will be described later, is detachably inserted.

Thus, the media card adapter 200 that includes the media card adapter 200A has a shape like a PC card, and detachably accommodates plural media cards of the same type or different types, e.g., two media cards 300A and 300B in the instant embodiment. Therefore, only when the laptop PC 100 forms the PC card slot 140 and the connector 150 that serves as a PC-card connector with the adapter 200, connectors 272 and 274 for the media cards 300A and 300B can be eliminated for manufacturing convenience.

The media card adapter 200A further includes a connector 272A to be connected to the media card 300A, and a connector 274A to be connected to the media card 300B. The reference numeral 272 generalizes 272A, 272B, etc. while the reference numeral 274 generalizes 274A, 274B, etc.

The media cards 300A and 300B are one exemplary function expanding media that expand functions of the laptop PC 100 and cover, but are not limited to, a Compact Flash ("CF") type communication card, a Micro-Drive, a Smart Media, a SD card, a Multi Media Card ("MMC"), and a memory stick. The reference numeral 300 generalizes 300A, 300B, etc.

The "Compact Flash ("CF") card", as used herein, is a storage medium that is used for a digital camera and a hand-held PC and a Zaurus equipped with Windows CE®, and has a capacity between 8 and 128 MB with a thickness of about 3 mm and a width of about 40 mm and a length of about 40 mm. The "Micro-Drive" has a length of 36.4 mm, a width of 42.8 mm, and a thickness of 5.0 mm, and a small hard disc drive pursuant to the CF standard called Type 2. The "Smart Media" is a medium that installs several CFs in the card, exchanges data with various units through plane electrode terminals provided on one surface of the card, and serves as an image-recording electronic film for a digital still camera. The "SD card" is a small memory card standard that has a secured feature with a length of 24 mm, a width of 32 mm and a thickness of 2.1 mm, and enables the SD card or a multimedia card to store e-mails, downloaded music and images when installed in a cell phone. The "MMC" is a memory card that is used for a portable music player etc. and has a length of 24 mm, a width of 32 mm and a thickness of 1.4 mm. The "Memory Stick" is a stick-shaped memory device used for a digital camera and a cell phone.

In the media card adapter 200A, the media card 300A is inserted into the slot 212A in a direction A parallel to the insertion direction A for the media card adapter 200A shown in FIG. 1. The media card 300B is inserted into the slot 222A in a direction B orthogonal to the insertion direction A for the media card adapter 200A shown in FIG. 1.

Figure 6:
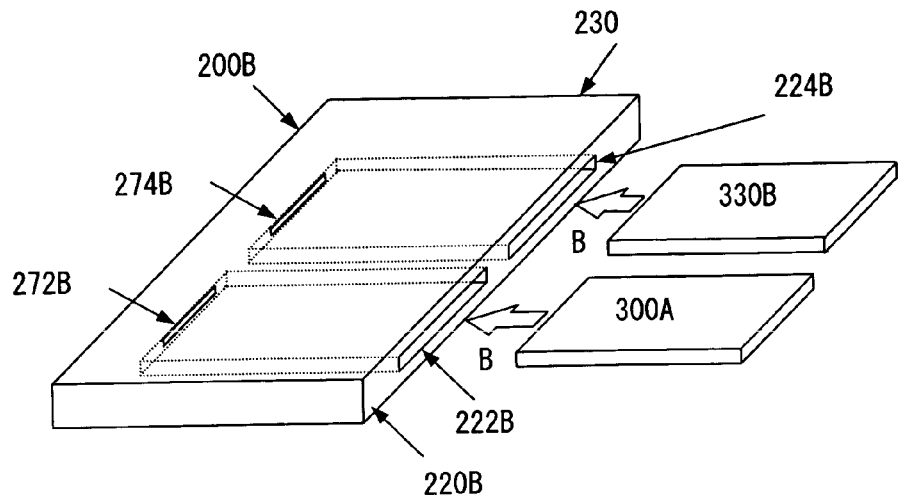
FIG. 6 is a schematic perspective view of another media card to be inserted into a media card adapter applicable to the electronic apparatus shown in FIG. 1.

Referring now to FIG. 6, a description will be given of the media card adapter 200B. Here, FIG. 6 is a schematic perspective view of the media card adapter 200B. The media card adapter 200B has a rectangular parallelepiped shape like a PC card shape, and includes a side surface 220B that has media card slots 222B and 224B, and the rear surface 230 that forms a PC-card connector 232 (not shown) and serves as a connector with the connector 150 of the laptop PC 100 shown in FIG. 5. The side and rear surfaces 220B and 230 are arranged orthogonal to each other. The slot 224B is located at the same position with the same shape as the slot 222A in the instant embodiment, but may be located at a different position with a different shape.

The media card slot 222B serves as an insertion opening into which the above media card 300A, for example, is detachably inserted. The media card slot 224B serves as an insertion opening into which the above media card 300B, for example, is detachably inserted. In the media card adapter 200B, the media cards 300A and 300B are inserted into the slots 222A and 224B in the direction B orthogonal to the insertion direction A for the media card adapter 200A shown in FIG. 1. The media card adapter 200B further includes a connector 272B to be connected to the media card 300A, and a connector 274B to be connected to the media card 300B.

Figure 7:
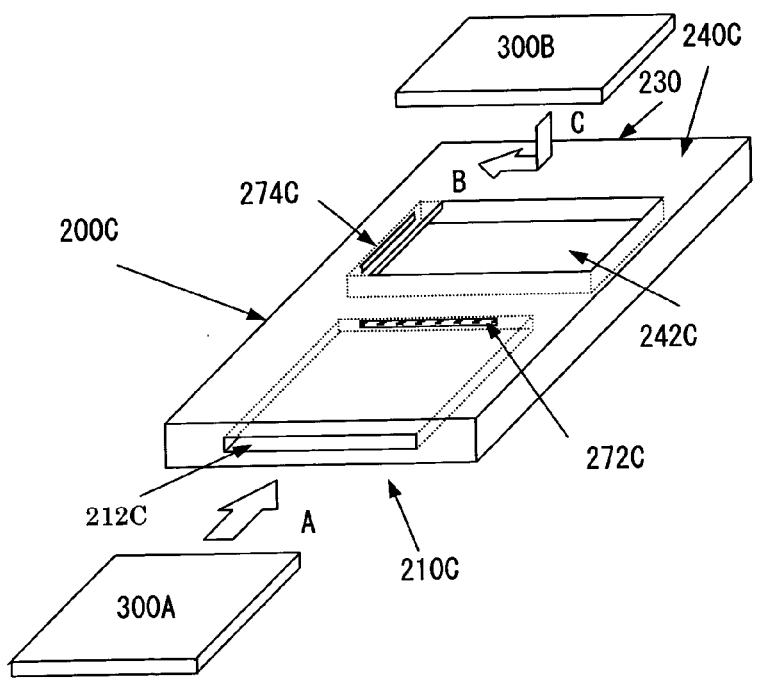
FIG. 7 is a schematic perspective view of still another media card to be inserted into a media card adapter applicable to the electronic apparatus shown in FIG. 1.

Referring now to FIG. 7, a description will be given of the media card adapter 200C. Here, FIG. 7 is a schematic perspective view of the media card adapter 200C. The media card adapter 200C has a rectangular parallelepiped shape like a PC card shape, and includes a front surface 210C that has a media card slot 212C, and a top surface 240C that has a media card slot 242C, and the rear surface 230 that forms the PC-card connector 232 (not shown) and serves as a connector to be connected to the connector 150 of the laptop PC 100 shown in FIG. 5. The front, top and rear surfaces 210C, 240C and 230 are arranged orthogonal to each other.

The media card slot 212C serves as an insertion opening into which the above media card 300A, for example, is detachably inserted. The media card slot 242C serves as an insertion opening into which the above media card 300B, for example, is detachably inserted. In the media card adapter 200C, the media card 300A is inserted into the slot 212C in the direction A parallel to the insertion direction A for the media card adapter 200A shown in FIG. 1. The media card 300B is inserted into the slot 242C in a direction C orthogonal to the insertion direction A for the media card adapter 200A shown in FIG. 1, and then moved in the direction B orthogonal to the insertion direction A, as described later. The media card adapter 200C further includes a connector 272C to be connected to the media card 300A, and a connector 274C to be connected to the media card 300B.

Referring now to FIGS. 8–11, a description will be given of an insertion/ejection mechanism applied to the slot 242C of the media card adapter 200C. Here, FIG. 8A is a schematic plane view of the media card adapter 200C. FIG. 8B is a longitudinal sectional view of the media card adapter 200C. FIG. 8C is a lateral sectional view of the media card adapter 200C. FIGS. 9A to 9C are schematic sectional views for explaining a method for inserting the media card 300B into the media card adapter 200C. FIGS. 10A–10C are a schematic plane view, a longitudinal sectional view, and a lateral sectional view of the media card adapter 200C into which the media card 300B has been inserted in accordance with the method shown in FIGS. 9A to 9C. FIG. 11 is a schematic sectional view for explaining a method for ejecting the media card 300B from the media card adapter 200C.

Figures 9A, 9B, 9C:
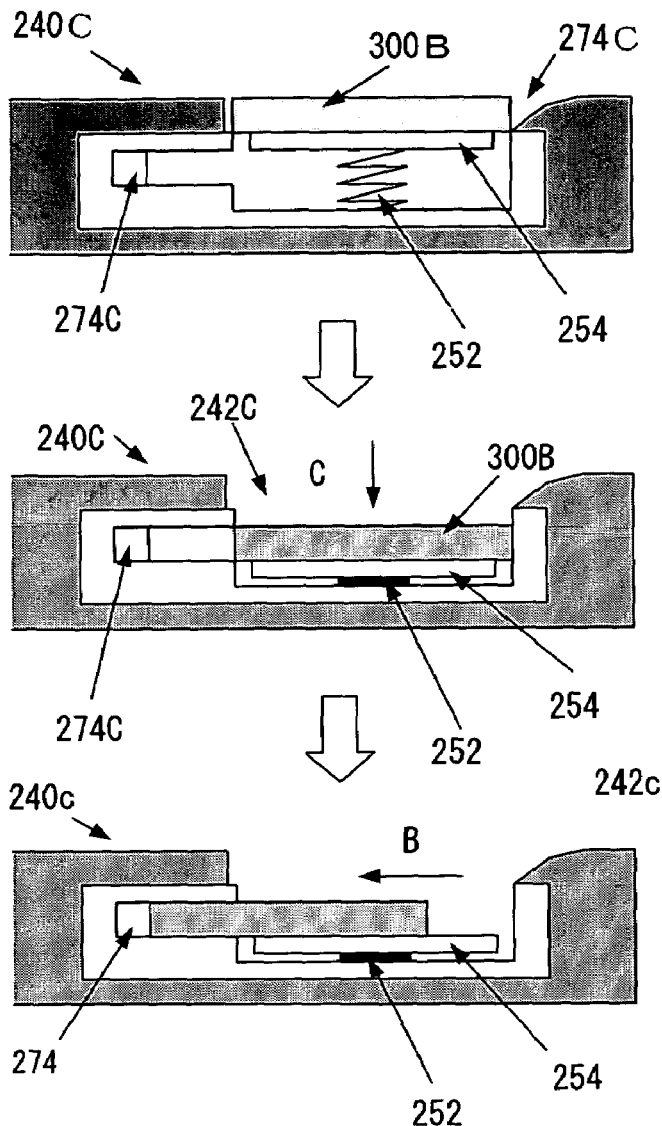
FIGS. 9A–9C are schematic sectional views for explaining a method for inserting a media card into the media card adapter shown in FIGS. 8A–8C.

As shown in FIG. 8, an insertion/ejection mechanism 250 includes a compression spring 252 one end of which is fixed on the bottom of the slot 242C, and a support plate 254 fixed to the other end of the compression spring 252. The media card 300B is inserted through the slot 242C, as shown in FIG. 9A, and pressed against the elastic force of the compression spring 252 in the arrow C direction, as shown in FIG. 9B, and moved in the arrow B direction and connected to the connector 274C, as shown in FIG. 9C. FIG. 10 shows this state. A moving distance of the media card 300B in FIG. 9C is set to be a distance in which the compression spring 242 does not eject the media card 300B from the slot 242C in FIG. 10. Alternatively, when the media card 300B is connected to the connector 274C, the support plate 254 may be locked at a position shown in FIG. 10. The insertion/ejection mechanism 250 can apply any structure known in the art, and a detailed description thereof will be omitted.

Figure 11A:
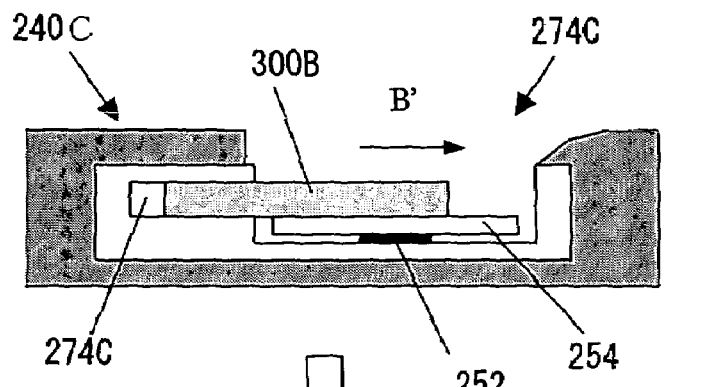
FIG. 11 is a schematic sectional view for explaining a method for ejecting the media card from the media card adapter shown in FIG. 10.
Figure 11B:
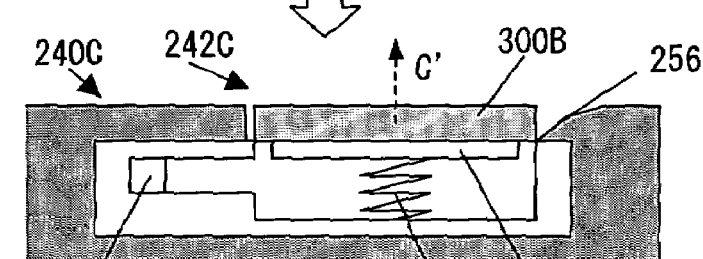
Figure 11C:
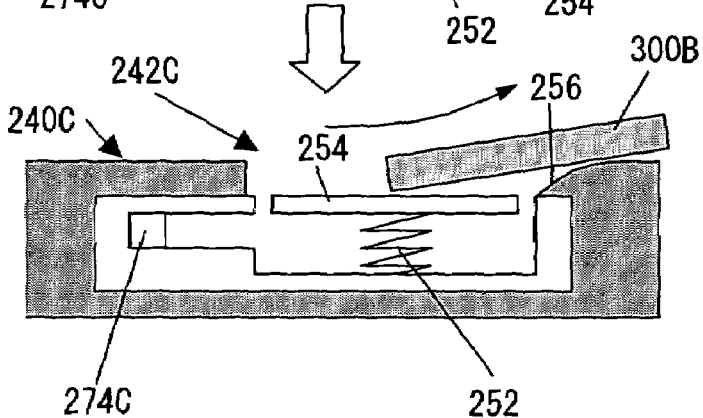

Reverse actions to FIGS. 9A to 9C are conducted in order to eject the media card 300B. That is, as shown in FIG. 11A, the media card 300B is moved in an arrow B' direction opposing the B direction shown in FIG. 9C to disconnect it from the connector 274C. After it corresponds to the slot 242C, as shown in FIG. 11B, the elastic force of the compression spring 252 moves the media card 300B to the top position in an arrow C' direction reverse to the C direction shown in FIG. 9B. Then, as shown in FIG. 11C, a user forces the media card 300B in an arrow direction to eject it from the slot 242C through an inclined part 256.

The laptop PC 100 enables the media card 300A to be inserted into and ejected from the slots 212A and 212C while the media card adapters 200A and 200B are being accommodated in the base 110 via the PC card slot 140. The laptop PC 100 enables the media cards 300A and 300B to be inserted into and ejected from the slots 222A, 222B and 222C while the media card adapters 200A and 200B are being accommodated in the base 110 via the media-card insertion/ejection window 142. The laptop PC 100 enables the media card 300B to be inserted into and ejected from the slots 242A while the media card adapter 200C is being accommodated in the base 110 via the media-card insertion/ejection window 144. Thus, the laptop PC 100 enables the media cards 300A and 300B of the same type or different types to be independently inserted into and ejected from the media card adapter 200 while the media card adapter 200 is being accommodated in the laptop PC 100, and thus has improved operability. Of course, the media cards 300A and 300B do not have to be necessarily used at the same time.

While the laptop PC 100 has two media-card insertion/ejection windows 142 and 144, the present invention is not limited to this embodiment as described in the following embodiments.

Figure 2:
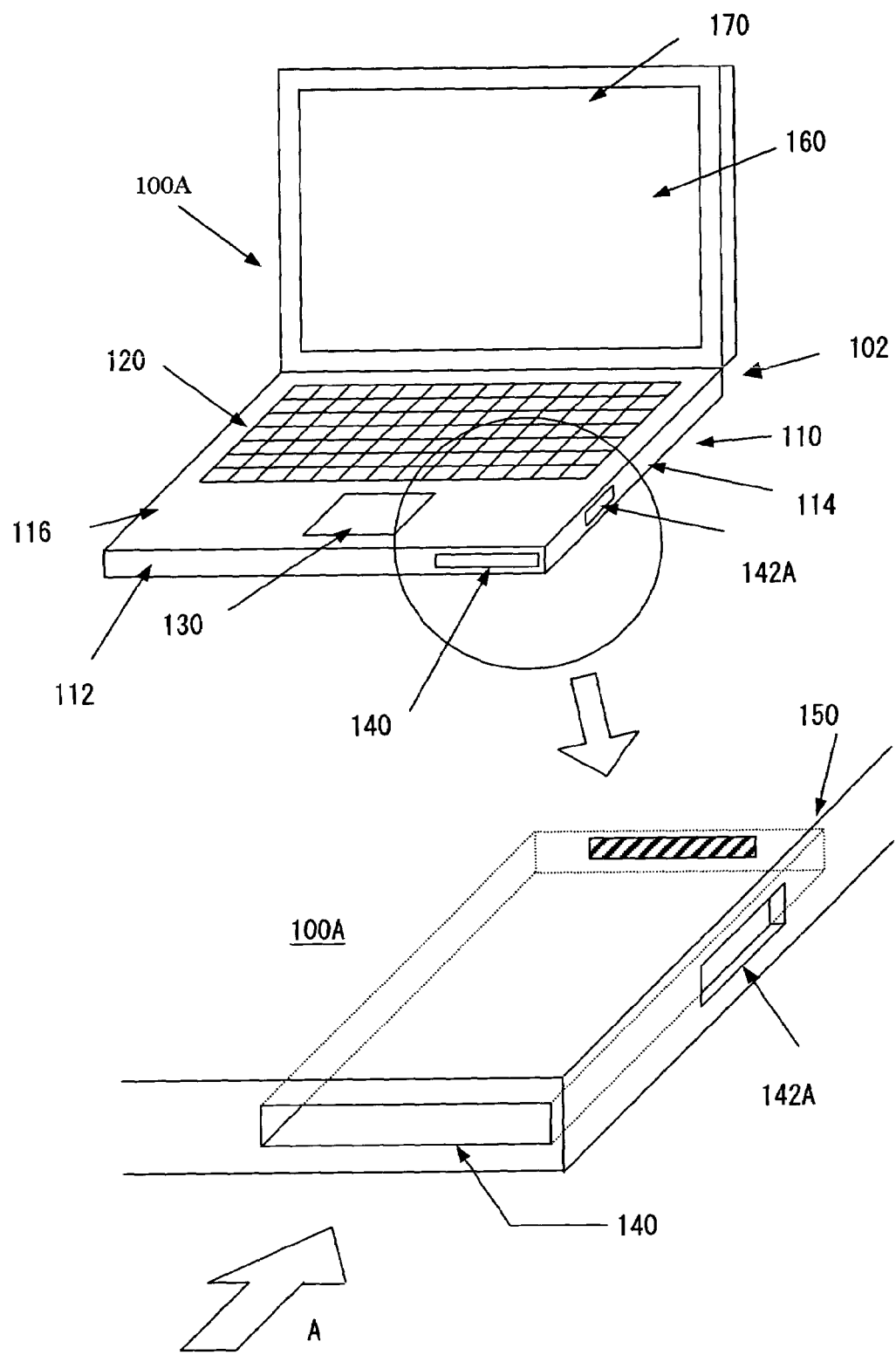
FIG. 2 is a schematic perspective view of an electronic apparatus of a second embodiment according to the present invention.

A description will now be given of a laptop PC 100A according to a second embodiment of the present invention with reference to FIGS. 2, 12 and 13. FIG. 2 is a schematic perspective view of the laptop PC 100A having the media-card insertion/ejection window 142A. In FIGS. 2, 12 and 13, those elements which are the same elements in FIG. 1 are designated by the same reference numerals, and a description thereof will be omitted.

The laptop PC 100A is compatible with the media card adapter 200A, and the media-card insertion/ejection window 142A exposes the slot 222A of the media card adapter 200A. The media-card insertion/ejection window 142A exposes only the slot 224B for the media card adapter 200B, and thus is longer than the media-card insertion/ejection window 142.

Figure 12A:
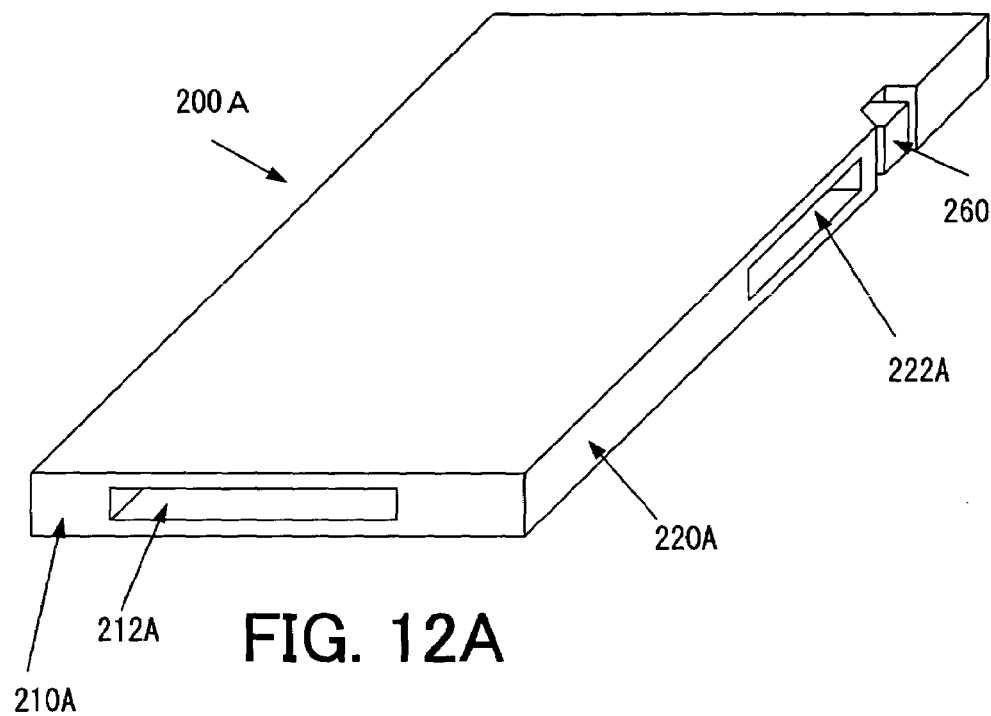
FIG. 12 is a perspective overview of the electronic apparatus shown in FIG. 2 into which a compatible media card adapter has been inserted.
Figure 12B:
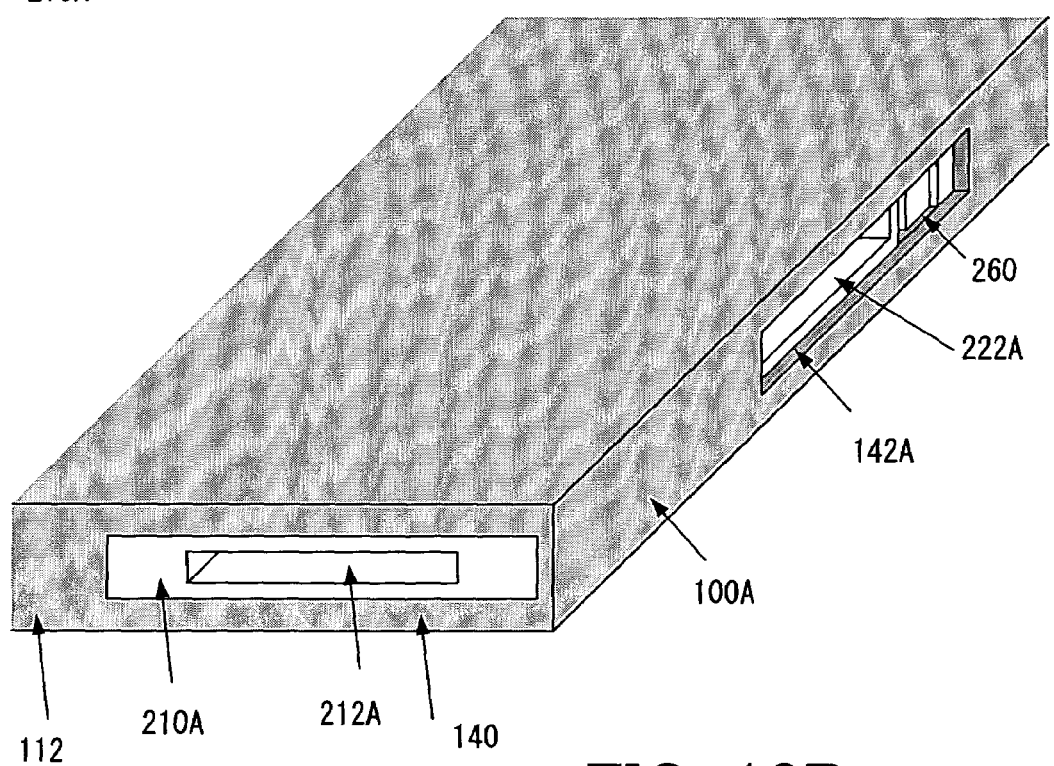
Figure 13A:
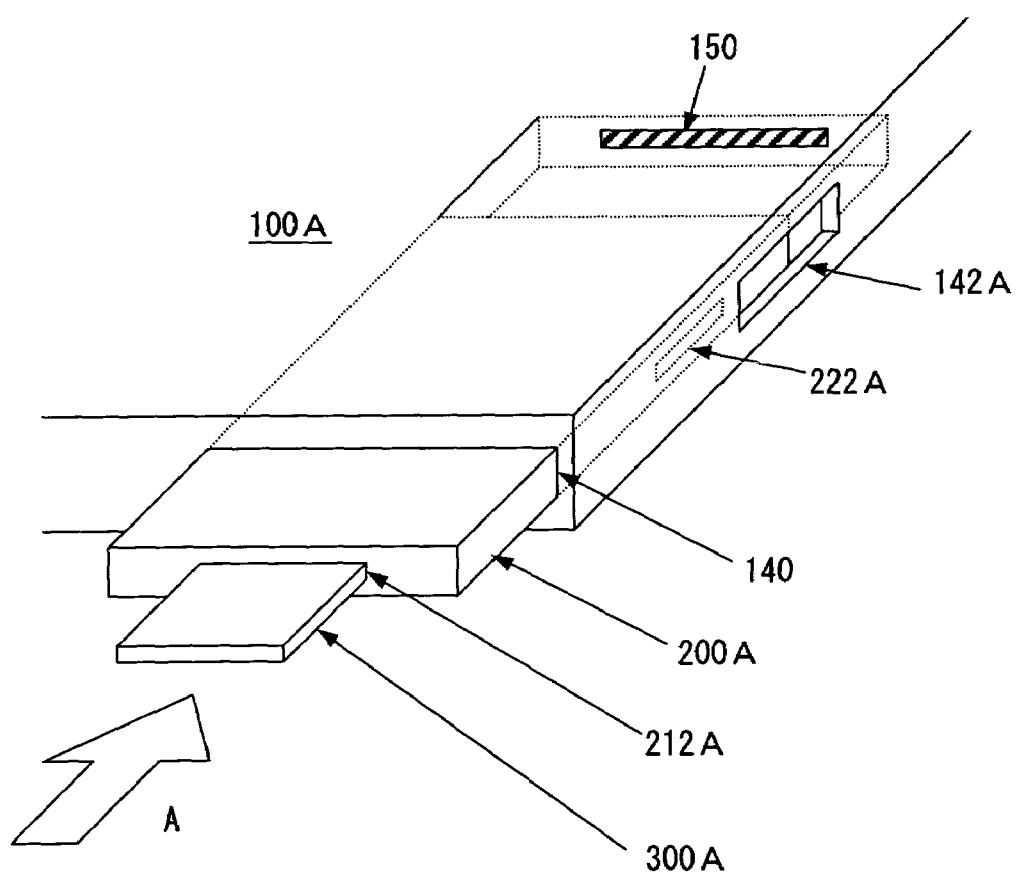
FIG. 13 is a schematic perspective view for explaining a method for inserting the media card adapter shown in FIG. 12 into the electronic apparatus and for inserting the media card into the media card adapter.
Figure 13B:
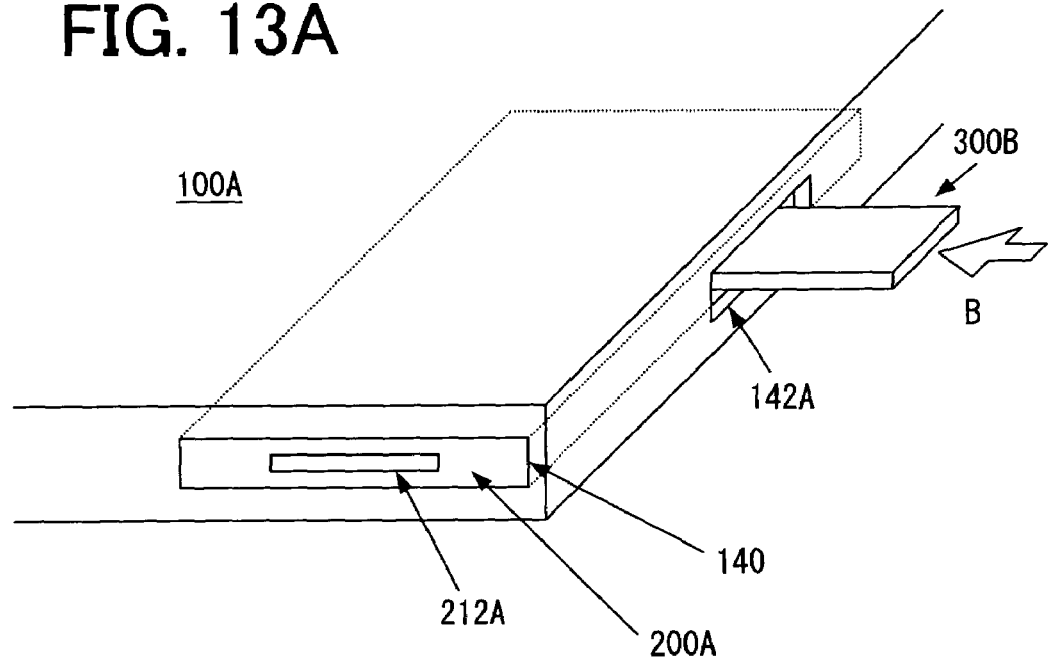

FIG. 12 shows the laptop PC 100A that has loaded the media card adapter 200A. FIG. 12A is a schematic perspective view of the media card adapter 200A, and an eject button 260. An illustration of an eject button provided on a front surface 210A is omitted. FIG. 13A shows that the media card 300A is being inserted into the media card adapter 200A and the media card adapter 200A is being inserted into the laptop PC 100A. FIG. 13B shows that the media card 300B is being inserted into the media card adapter 200A through the media-card insertion/ejection window 142A while the laptop PC 100A installs the media card adapter 200A. FIG. 12B is a schematic partial perspective view of the laptop PC 100 that has loaded the media card adapter 200A.

As shown in FIG. 12B, the PC card slot 140 exposes the slot 212A, and the media-card insertion/ejection window 142A exposes the slots 222A and eject button 260. The insertion/ejection mechanism of the media card 300B for the media card adapter 200A that uses the eject button 260 can apply any structure known in the art, and a detailed description thereof will be omitted.

Thus, the laptop PC 100A has improved operability, because it enables plural media cards 300A and 300B of the same type or different types to be independently inserted into and ejected from the media card adapter 200A while the media card adapter 200A is accommodated in the laptop PC 100A.

Figure 3:
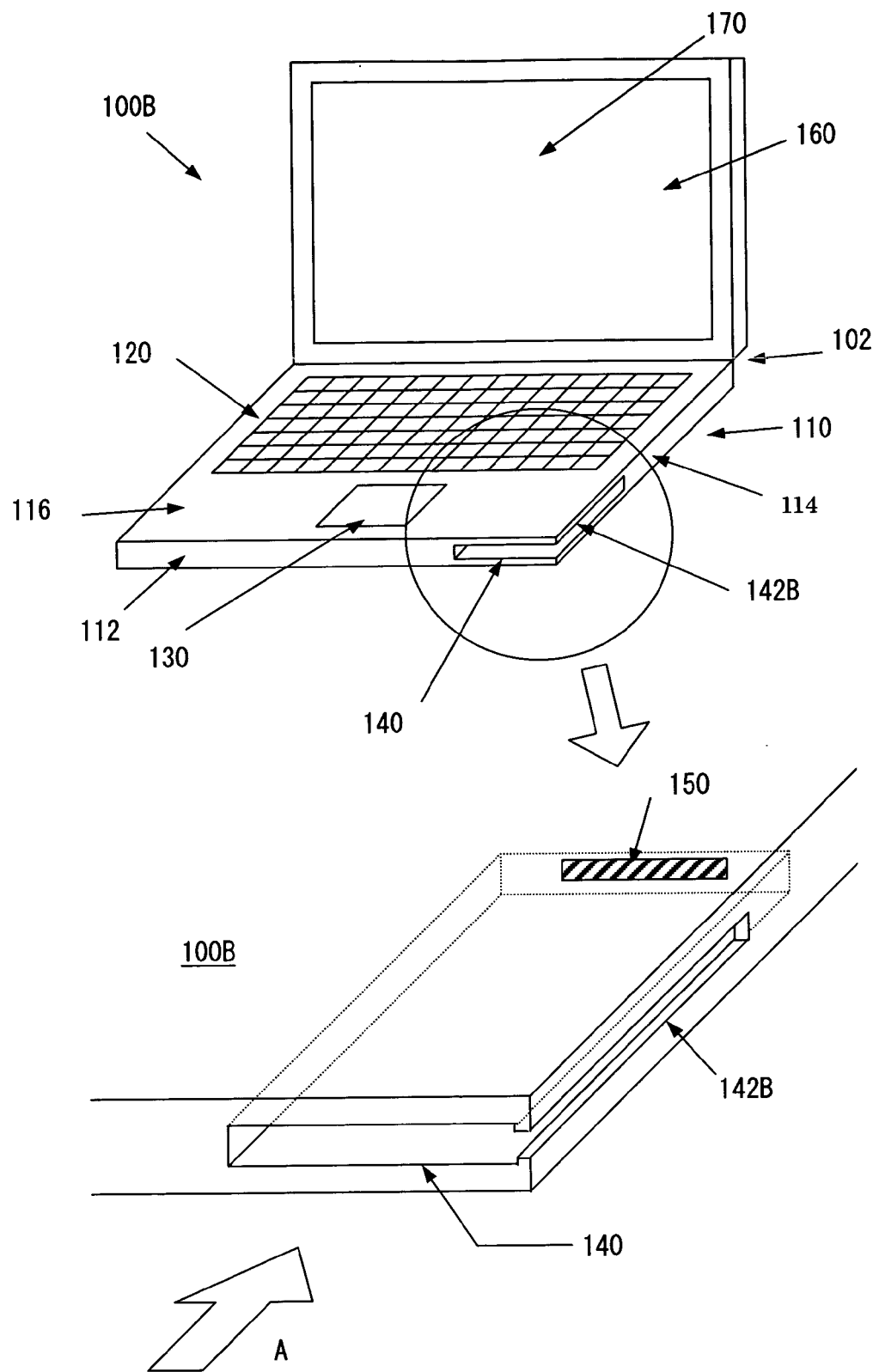
FIG. 3 is a schematic perspective view of an electronic apparatus of a third embodiment according to the present invention.
Figure 14:
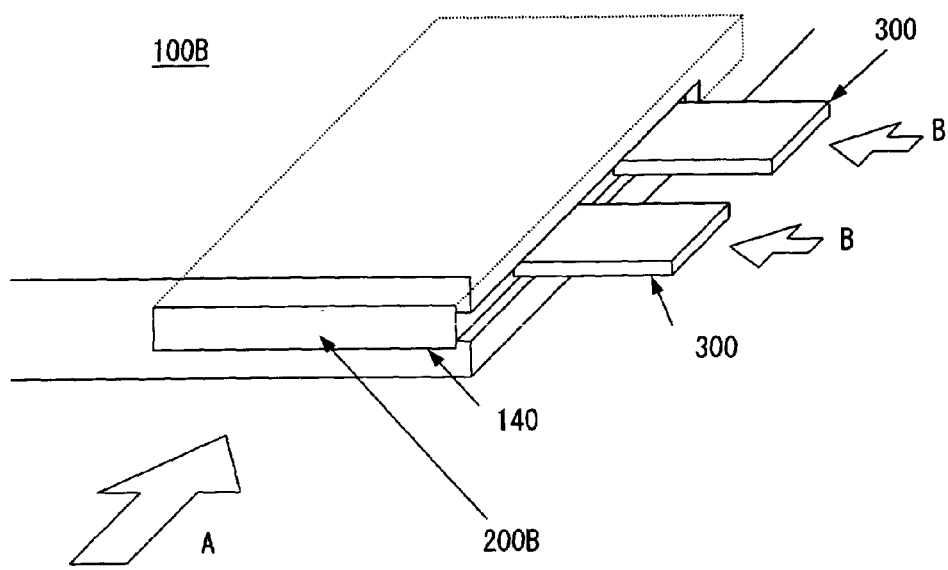
FIG. 14 is a schematic perspective view for explaining a method for inserting the media card adapter into the electronic apparatus shown in FIG. 3 and for inserting two media cards into the media card adapter.

A description will now be given of a laptop PC 100B according to a third embodiment of the present invention with reference to FIGS. 3 and 14. FIG. 3 is a schematic perspective view of the laptop PC 100B having the media-card insertion/ejection window 142B. In FIGS. 3 and 14, those elements which are the same elements in FIG. 1 are designated by the same reference numerals, and a description thereof will be omitted.

The laptop PC 100B is compatible with the media card adapter 200B, and the media-card insertion/ejection window 142B exposes the slots 222B and 224B of the media card adapter 200B, and is connected to the PC card slot 140. FIG. 14 shows that the media cards 300A and 300B are inserted into the media card adapter 200B via the media-card insertion/ejection window 142B while the laptop PC 100B has loaded the media card adapter 200B.

Thus, the laptop PC 100B has improved operability, because it enables plural media cards 300A and 300B of the same type or different types to be independently inserted into and ejected from the media card adapter 200B while the media card adapter 200B is accommodated in the laptop PC 100B.

Figure 4:
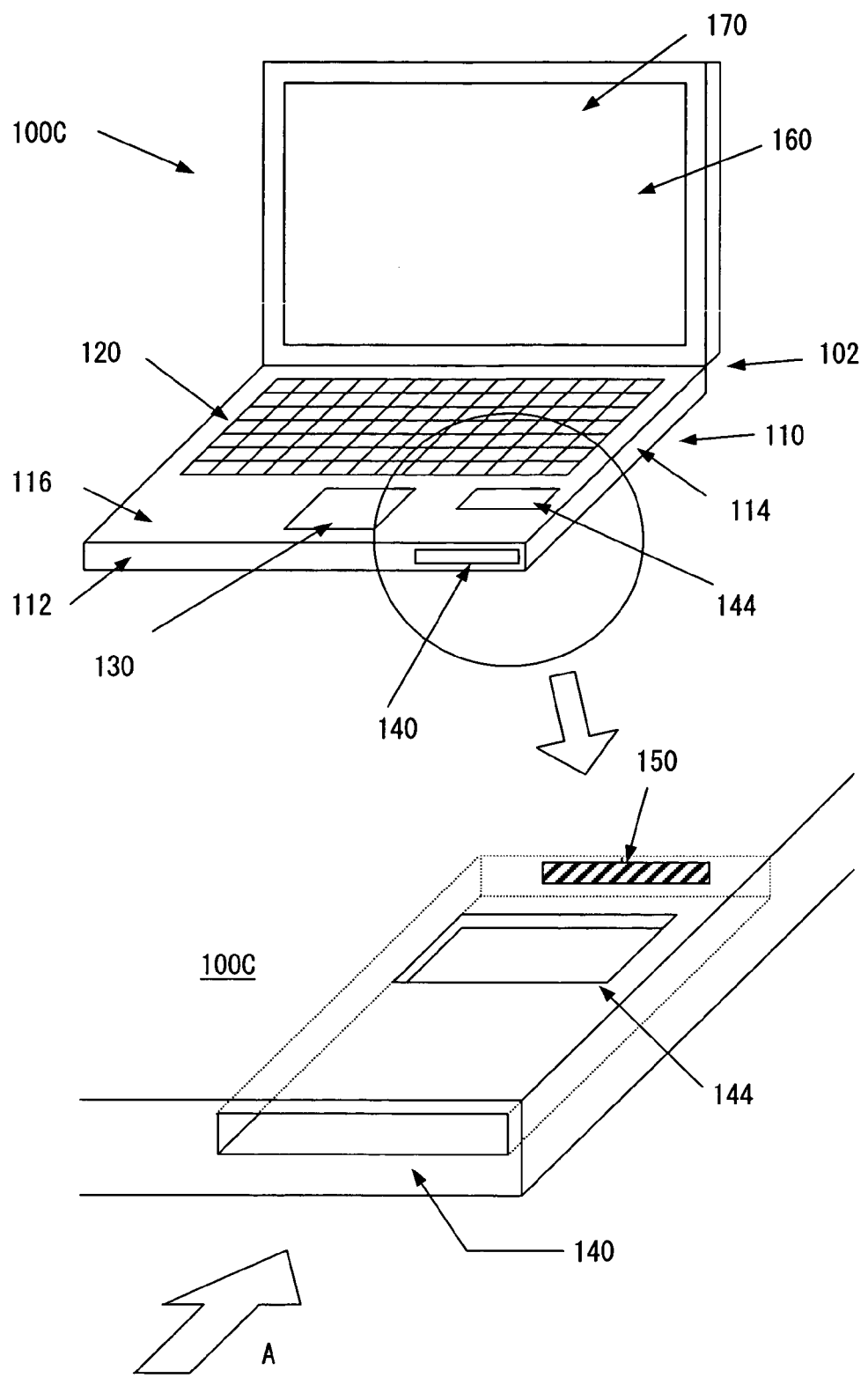
FIG. 4 is a schematic perspective view of an electronic apparatus of a fourth embodiment according to the present invention.
Figure 15:
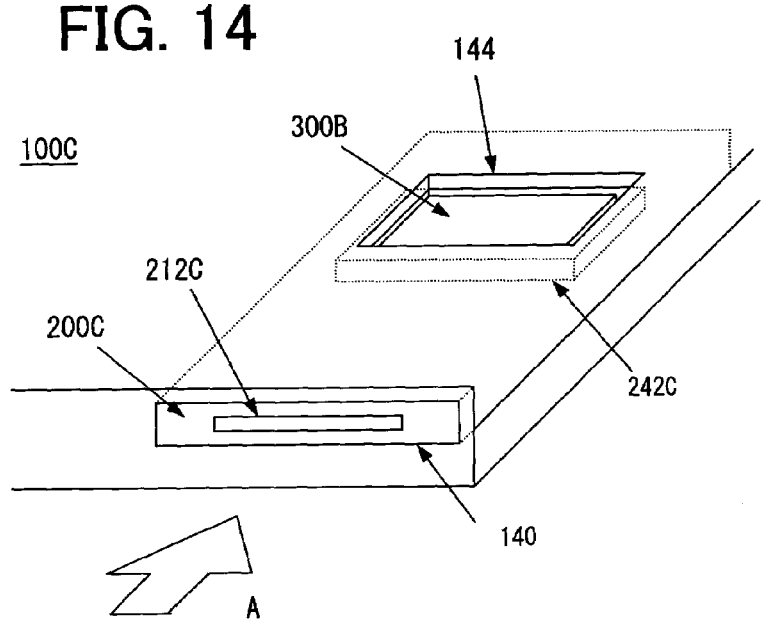
FIG. 15 is a perspective overview of the electronic apparatus shown in FIG. 4 into which a compatible media card adapter has been inserted.

A description will now be given of a laptop PC 100B according to a fourth embodiment of the present invention with reference to FIGS. 4 and 15. FIG. 4 is a schematic perspective view of the laptop PC 100B having the media-card insertion/ejection window 144. In FIGS. 4 and 15, those elements which are the same elements in FIG. 1 are designated by the same reference numerals, and a description thereof will be omitted.

The laptop PC 100C is compatible with the media card adapter 200C, and the media-card insertion/ejection window 144 exposes the slot 242C of the media card adapter 200C. FIG. 15 shows that the laptop PC 100C has loaded the media card adapter 200C.

Thus, the laptop PC 100C has improved operability, because it enables plural media cards 300A and 300B of the same type or different types to be independently inserted into and ejected from the media card adapter 200C while the media card adapter 200C is accommodated in the laptop PC 100C.

Figure 16:
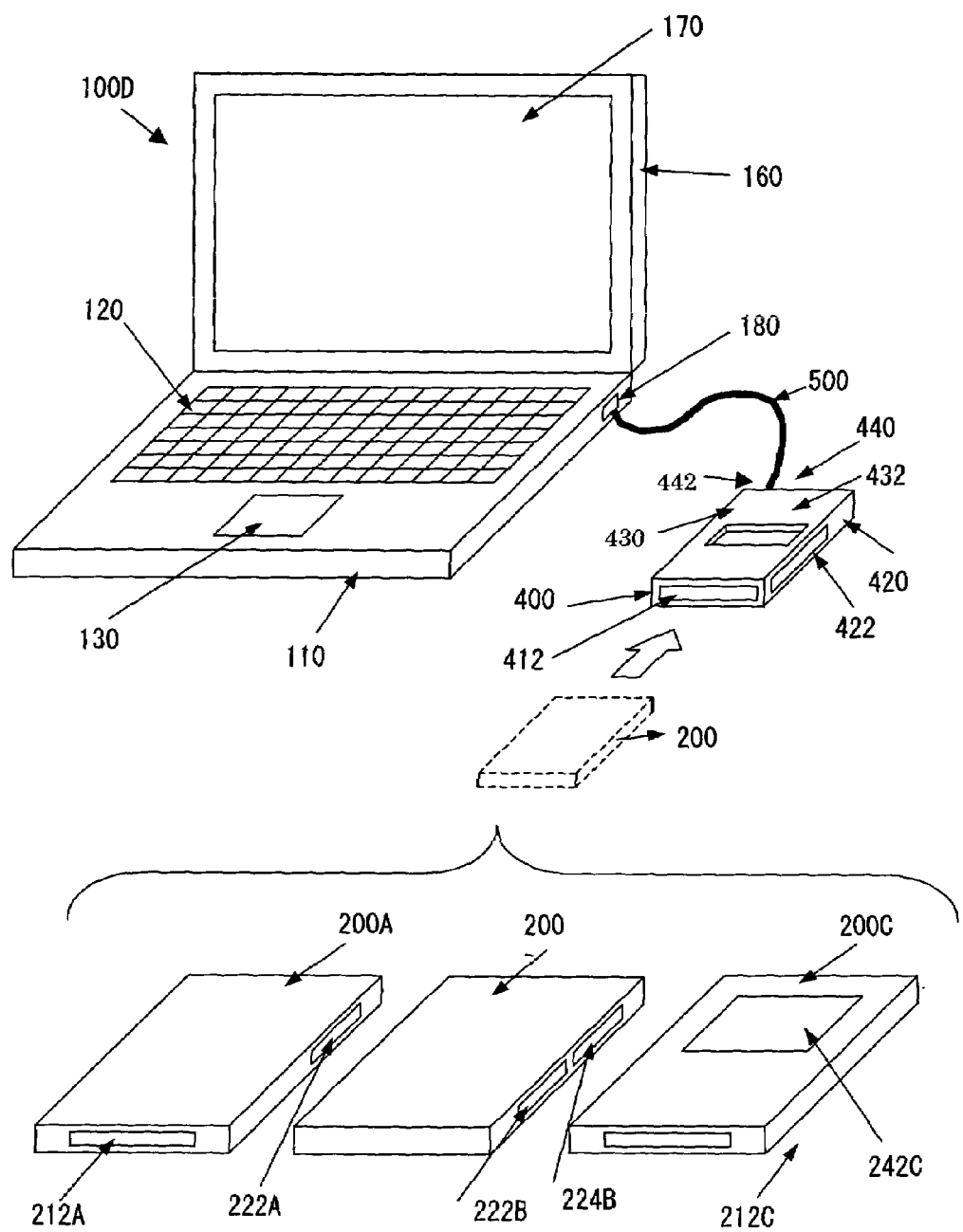
FIG. 16 is a schematic perspective view of an electronic apparatus and a function expanding unit according to another aspect of the present invention.
Figure 17:
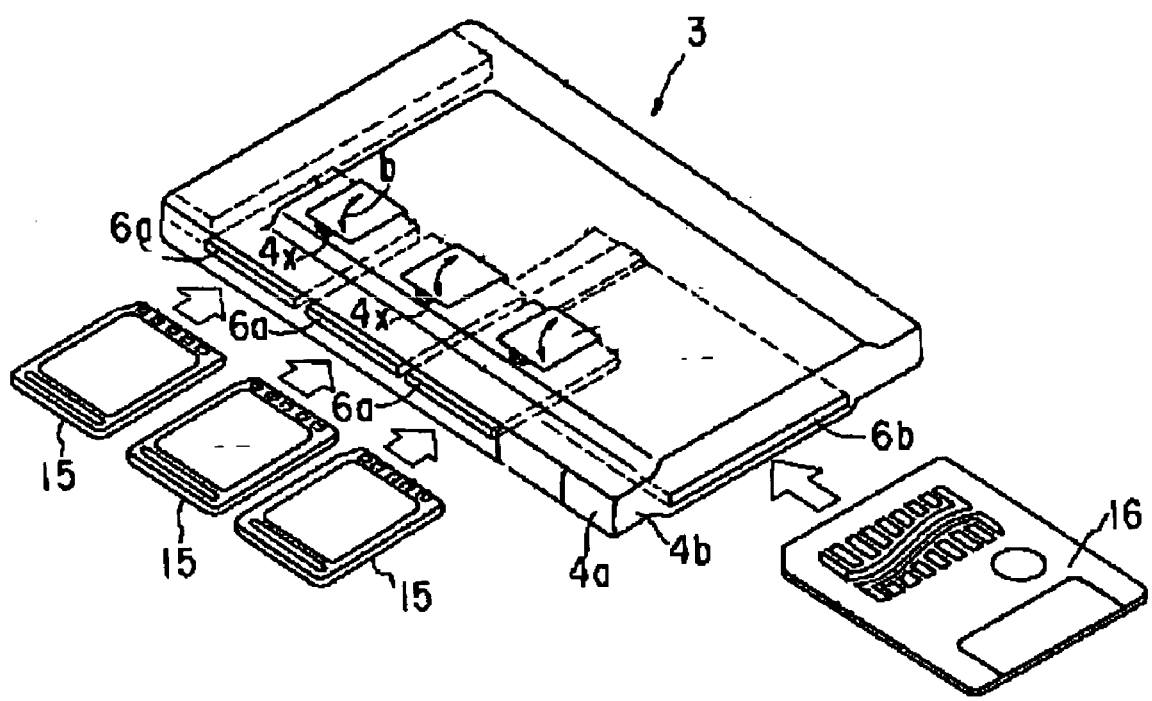
FIG. 17 is a schematic perspective view of a conventional adapter.

A description will now be given of an inventive function expanding unit 400 with reference to FIG. 16. The function expanding unit 400 is connected via a USB cable 500 to an electronic apparatus that is implemented as a laptop PC 100D. In FIG. 16 those elements which are the same elements in FIG. 1 are designated by the same reference numerals, and a description thereof will be omitted. The function expanding unit 400 may be part of the electronic apparatus 100D rather than a separate member from the electronic apparatus 100D.

The laptop PC 100D has a USB connector 180 instead of the PC card slot 140 and the media-card insertion/ejection windows 142 and 144. The laptop PC 100D may have a SCSI connector and another type of connector instead of the USB connector 180, and be connected to the function expanding unit 400 via a SCSI cable (not shown) instead of the USB cable 500.

The function expanding unit 400 has a front surface 410, a side surface 420, a top surface 430, and a rear surface 440. A PC card slot 412 is provided on the front surface 410, and a media-card insertion/ejection window 422 is provided on the side surface 420. A media-card insertion/ejection window 432 is provided on the top surface 430, and a USB connector (not shown) is provided on the rear surface 440. It is understood that the function expanding unit 400 exhibits operations and effects similar to those of the laptop PC 100 shown in FIG. 1, since the PC card slot 412 corresponds to the PC card slot 140 shown in FIG. 1 and the media-card insertion/ejection windows 422 and 432 correspond to the media-card insertion/ejection windows 142 and 144. In other words, the function expanding unit 400 that expands functions of the laptop PC 100D has improved operability, because it enables plural media cards 300A and 300B of the same type or different types to be independently inserted into and ejected from the media card adapter 200 while the media card adapter 200 is accommodated in the function expanding unit 400.

It is understood that structures circled in FIGS. 2 to 4 are applicable to the function expanding unit 400. Therefore, the function expanding unit 400 may be configured so as to exhibit operations and effects similar to those of the laptop PC 100A to 100C.

Further, the present invention is not limited to these preferred embodiments, and various modifications and changes may be made in the present invention without departing from the spirit and scope thereof. For example, the media-card insertion/ejection window may be provided at the bottom of the electronic apparatus and the function expanding unit. In addition, the function expanding medium is not limited to a media card.

The present invention thus does not concentrate a formation of the abrasive powder only on particular part of the head support part, and prevents dropping of the abrasive powder onto the record carrier, providing stable and reliable recording and reproducing actions. In addition, the reduced exchange frequency of the head and/or the record carrier provides good economic efficiency.

Thus, the present invention can provide an electronic apparatus and function expanding unit that have improved operability by enabling plural media cards of the same type or different types to be independently inserted into and ejected from a media card adapter while the media card adapter is accommodated in the electronic apparatus or function expanding unit.

What is claimed is:

1. An electronic apparatus having functions to be expanded by first and second function expanding media, said electronic apparatus comprising:
   a connector that is connectable electrically to an adapter, said adapter having a first insertion opening into which the first function expanding medium is detachably inserted, and a second insertion opening into which the second function expanding medium is detachably inserted; and
   a housing that has first and second surfaces, and accommodates the adapter, the first surface having a third insertion opening that exposes the first insertion opening, and the second surface being arranged substantially orthogonal to the first surface and having a fourth insertion opening that exposes the second insertion opening, wherein
   the adapter includes an insertion/ejection mechanism that applies an elastic force to the first function expanding medium when the first expanding medium is inserted into the adapter in an opposite direction to an insert direction of the first function expanding medium,
   the first function expanding medium is inserted through the first and third insertion openings against the elastic force, and then moved in an orthogonal direction to the insert direction, and
   in disconnecting the first function expanding medium from the adapter, the first function expanding medium is moved back along the orthogonal direction, then moved along the insert direction using the elastic force, and ejected from the first and third insertion openings.

2. An electronic apparatus according to claim 1, wherein the adapter includes an eject button to eject the second function expanding medium, and the fourth insertion opening further exposes the eject button.

3. An electronic apparatus having functions to be expanded by first and second function expanding media, said electronic apparatus comprising:
   a connector that is connectable electrically to an adapter, said adapter having a first insertion opening into which the first function expanding medium is detachably inserted, and a second insertion opening into which the second function expanding medium is detachably inserted; and
   a housing that has first and second surfaces, and accommodates the adapter, the first surface having a third insertion opening that exposes the first insertion opening, and a fourth insertion opening that exposes the second insertion opening, and the second surface being arranged substantially orthogonal to the first surface and having a fifth insertion opening into which the adapter is detachably inserted, wherein
   the adapter includes an insertion/ejection mechanism that applies an elastic force to the first function expanding medium when the first expanding medium is inserted into the adapter in an opposite direction to an insert direction of the first function expanding medium,
   the first function expanding medium is inserted through the first and third insertion openings against the elastic force, and then moved in an orthogonal direction to the insert direction, and
   in disconnecting the first function expanding medium from the adapter, the first function expanding medium is moved back along the orthogonal direction, then moved along the insert direction using the elastic force, and ejected from the first and third insertion openings.

4. An electronic apparatus according to claim 3, wherein the fifth insertion opening is a PC card slot.

5. An electronic apparatus according to claim 3, wherein the adapter includes an eject button to eject the second function expanding medium, and the fourth insertion opening further exposes the eject button.

6. An electronic apparatus having functions to be expanded by first and second function expanding media, said electronic apparatus comprising:
   a connector that is connectable electrically to an adapter, said adapter having a first insertion opening into which the first function expanding medium is detachably inserted, and a second insertion opening into which the second function expanding medium is detachably inserted; and
   a housing that accommodates the adapter, and has a third insertion opening that exposes the first insertion opening, and a fourth insertion opening that exposes the second insertion opening, and a fifth insertion opening into which the adapter is detachably inserted, wherein at least one of the first and second function expanding media are inserted into at least one of the third and fourth insertion openings in a direction substantially orthogonal to a direction in which the adapter is inserted into the fifth insertion opening, wherein
   the adapter includes an insertion/ejection mechanism that applies an elastic force to the first function expanding medium when the first expanding medium is inserted into the adapter in an opposite direction to an insert direction of the first function expanding medium,
   the first function expanding medium is inserted through the first and third insertion openings against the elastic force, and then moved in an orthogonal direction to the insert direction, and in disconnecting the first function expanding medium from the adapter, the first function expanding medium is moved back along the orthogonal direction, then moved along the insert direction using the elastic force, and ejected from the first and third insertion openings.

7. An electronic apparatus according to claim 6, wherein the fifth insertion opening is a PC card slot.

8. An electronic apparatus according to claim 6, wherein the adapter includes an eject button to eject the second function expanding medium, and the fourth insertion opening further exposes the eject button.

9. An electronic apparatus having functions to be expanded by an function expanding medium, said electronic apparatus comprising:
- a connector that is connectable electrically to an arbitrary adapter selected from plural types of adapters, each adapter having at least two insertion openings into which at least two function expanding media are detachably inserted; and
- a housing that accommodates the adapter, and has a slot into which the adapter is detachably inserted, and at least two mouths that expose the at least two insertion openings, wherein at least one of the function expanding media are inserted into at least one of the insertion openings via the mouth in a direction substantially orthogonal to a direction in which the adapter is inserted into the slot, wherein
- the adapter includes an insertion/ejection mechanism that applies an elastic force to one of the function expanding media when the one of the function expanding media is inserted into the adapter in an opposite direction to an insert direction of the one of the function expanding media,
- the one of the function expanding media is inserted through insertion openings corresponding to the one of the function expanding media against the elastic force, and then moved in an orthogonal direction to the insert direction, and
- in disconnecting the one of the function expanding media from the adapter, the one of the function expanding media is moved back along the orthogonal direction, then moved along the insert direction using the elastic force, and ejected from the insertion openings corresponding to the one of the function expanding media.

10. A function expanding unit that is connectible electrically to an electronic apparatus and expands functions of the electronic apparatus, said function expanding unit comprising:
- a connector that is connectable electrically to an adapter, said adapter having a first insertion opening into which a first function expanding medium that expands functions of the electronic apparatus is detachably inserted, and a second insertion opening into which a second function expanding medium that expands functions of the electronic apparatus is detachably inserted; and
- a housing that has first and second surfaces, and accommodates the adapter, the first surface having a third insertion opening that exposes the first insertion opening, and the second surface being arranged substantially orthogonal to the first surface and having a fourth insertion opening that exposes the second insertion opening, wherein
- the adapter includes an insertion/ejection mechanism that applies an elastic force to the first function expanding medium when the first expanding medium is inserted into the adapter in an opposite direction to an insert direction of the first function expanding medium,
- the first function expanding medium is inserted through the first and third insertion openings against the elastic force, and then moved in an orthogonal direction to the insert direction, and
- in disconnecting the first function expanding medium from the adapter, the first function expanding medium is moved back along the orthogonal direction, then moved along the insert direction using the elastic force, and ejected from the first and third insertion openings.

11. A function expanding unit according to claim 10, wherein the adapter includes an eject button to eject the second function expanding medium, and the fourth insertion opening further exposes the eject button.

12. A function expanding unit that is connectible electrically to an electronic apparatus and expands functions of the electronic apparatus, said function expanding unit comprising:
- a connector that is connectable electrically to an adapter, said adapter having a first insertion opening into which a first function expanding medium that expands functions of the electronic apparatus is detachably inserted, and a second insertion opening into which a second function expanding medium that expands functions of the electronic apparatus is detachably inserted; and
- a housing that has first and second surfaces, and accommodates the adapter, the first surface having a third insertion opening that exposes the first insertion opening, and a fourth insertion opening that exposes the second insertion opening, and the second surface being arranged substantially orthogonal to the first surface and having a fifth insertion opening into which the adapter is detachably inserted, wherein
- the adapter includes an insertion/ejection mechanism that applies an elastic force to the first function expanding medium when the first expanding medium is inserted into the adapter in an opposite direction to an insert direction of the first function expanding medium,
- the first function expanding medium is inserted through the first and third insertion openings against the elastic force, and then moved in an orthogonal direction to the insert direction, and
- in disconnecting the first function expanding medium from the adapter, the first function expanding medium is moved back along the orthogonal direction, then moved along the insert direction using the elastic force, and ejected from the first and third insertion openings.

13. A function expanding unit according to claim 12, wherein the fifth insertion opening is a PC card slot.

14. A function expanding unit according to claim 12, wherein the adapter includes an eject button to eject the second function expanding medium, and the fourth insertion opening further exposes the eject button.

15. A function expanding unit that is connectible electrically to an electronic apparatus and expands functions of the electronic apparatus, said function expanding unit comprising:
- a connector that is connectable electrically to an adapter, said adapter having a first insertion opening into which a first function expanding medium that expands functions of the electronic apparatus is detachably inserted, and a second insertion opening into which the second function expanding medium that expands functions of the electronic apparatus is detachably inserted; and
- a housing that accommodates the adapter, and has a third insertion opening that exposes the first insertion opening, and a fourth insertion opening that exposes the second insertion opening, and a fifth insertion opening into which the adapter is detachably inserted, wherein at least one of the first and second function expanding media are inserted into at least one of the third and fourth insertion openings in a direction substantially orthogonal to a direction in which the adapter is inserted into the fifth insertion opening, wherein the adapter includes an insertion/ejection mechanism that applies an elastic force to the first function expanding medium when the first expanding medium is inserted into the adapter in an opposite direction to an insert direction of the first function expanding medium, the first function expanding medium is inserted through the first and third insertion openings against the elastic force, and then moved in an orthogonal direction to the insert direction, and in disconnecting the first function expanding medium from the adapter, the first function expanding medium is moved back along the orthogonal direction, then moved along the insert direction using the elastic force, and ejected from the first and third insertion openings.

16. A function expanding unit according to claim 15, wherein the fifth insertion opening is a PC card slot.

17. A function expanding unit according to claim 15, wherein the adapter includes an eject button to eject the second function expanding medium, and the fourth insertion opening further exposes the eject button.

18. An electronic apparatus, comprising:

a connector;

an adapter that is connectable to said connector and has a plurality of openings into which function expanding media are detachably inserted; and a housing that accommodates the adapter and has first and second surfaces arranged substantially orthogonal to each other and having insertion openings that expose said plurality of openings of said adapter, wherein the adapter includes an insertion/ejection mechanism that applies an elastic force to one of the function expanding media when the one of the function expanding media is inserted into the adapter in an opposite direction to an insert direction of the one of the function expanding media, the one of the function expanding media is inserted through the insertion openings against the elastic force, and then moved in an orthogonal direction to the insert direction, and in disconnecting the one of the function expanding media from the adapter, the one of the function expanding media is moved back along the orthogonal direction, then moved along the insert direction using the elastic force, and ejected from the insertion openings.

* * * * *